Feb. 5, 1963 C. E. DENGLER 3,076,232
PROCESS FOR ORIENTING POLYETHYLENE FILM
Filed July 6, 1961
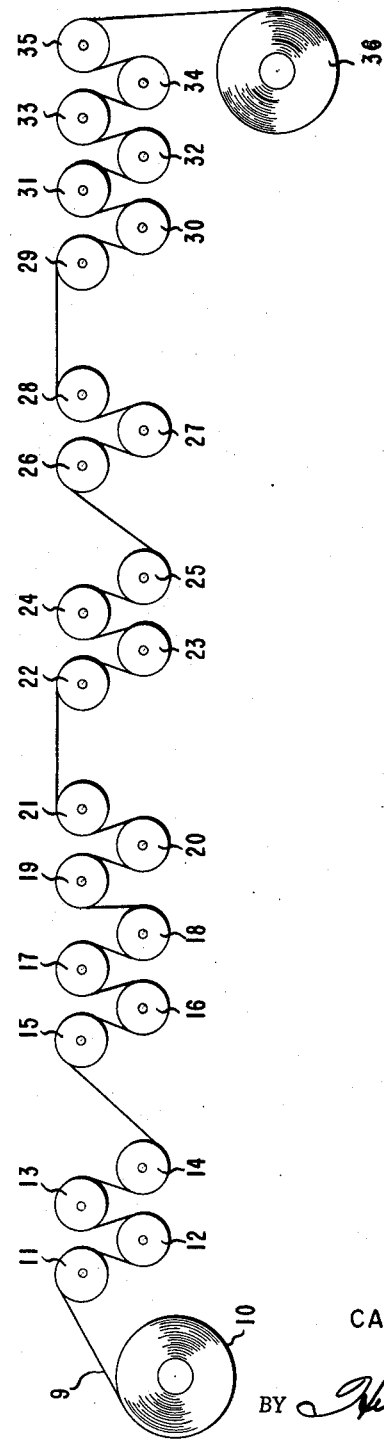
INVENTOR
CARL EUGENE DENGLER
BY Herbert M Wolfson
ATTORNEY United States Patent Office 3,076,232
Patented Feb. 5, 1963

3,076,232
PROCESS FOR ORIENTING POLYETHYLENE FILM
Carl Eugene Dengler, Williamsville, N.Y., assignor to
E. I. du Pont de Nemours and Company, Wilmington,
Del., a corporation of Delaware
Filed July 6, 1961, Ser. No. 122,333
6 Claims. (Cl. 18—48)

This invention relates to the preparation of novel polyethylene films. More particularly, it relates to a treatment for making polyethylene films suitable for conversions to bags, containers and similar packages.

For the purpose of this invention polyethylene films may be defined as films prepared from polyethylene compositions containing the solid polymers of ethylene: i.e., solid polyethylene and/or the solid pyrolysis products thereof, and also copolymers of ethylene with small percentages (less than 25%) of other materials copolymerizable therewith. Styrene, isobutylene, vinyl acetate, vinyl chloride and similar ethylenically unsaturated compounds are examples of such copolymerizable materials. The polyethylene compositions may also contain small amounts of natural and synthetic plastic materials, e.g., natural or synthetic uncured rubber, waxes, oils, resins; dyes and pigments; oxidation inhibitors and mineral fillers such as powdered calcium carbonate or titanium dioxide.

The important properties of packaging films are well known. They include strength, low elongation, heat sealability, moistureproofness, high gloss, stiffness, transparency and resistance to chemicals. Polyethylene film displays inherent moistureproofness, fair mechanical strength, and the film is resistant to most common chemicals. High gloss, stiffness, transparency and increased strength may be obtained by orienting the film in a stretching or rolling operation. However, there is one very important drawback resulting from stretching polyethylene film in accordance with heretofore known processes. The oriented film tends to shrink back to its original dimensions at elevated temperatures. This shrinkage makes it difficult, if not impossible, to form packages by heat sealing the edges of the film without obtaining unsightly puckering and distortions in the area adjacent to the heat seal. Furthermore, thermal shrinkage and deformation make storage of the oriented film difficult and preclude the use of the film in a variety of applications. Consequently, the commercial utilization of polyethylene film has been limited to the unoriented or, at most, slightly oriented polyethylene film. This means a film of moderate strength, low transparency, low stiffness (limp), low gloss, but dimensionally stable at elevated temperatures. In competition with other films available on the market, polyethylene film has suffered accordingly.

The object of the present invention is a novel polyethylene film having, besides inherent moistureproofness and resistance to chemicals, improved mechanical strength, transparency, gloss, stiffness and dimensional stability at elevated temperatures. Another object is to provide a polyethylene film suitable for the preparation of packaging materials. A further object is to provide a process for increasing the strength and imparting dimensional stability at elevated temperatures to a polyethylene film. Other objects will appear hereinafter.

The objects are accomplished by a polyethylene film which by X-ray diffraction analysis shows an oriented molecular structure and which is without any appreciable intermolecular strain. The film having such an oriented structure displays high strength and shrinks less than 5% at temperatures from 45° to 75° C.

The objects are further accomplished by a process which comprises stretching polyethylene film 2 to 4 times its original length in the direction of its length at a temperature $T_1$, $T_1$ being within the range from 50° C. to the melting temperature of the film, preferably no higher than 5° C. below the melting temperature of the film, annealing the film at a temperature $T_2$, $T_2$ being within the range from $T_1$ to the melting temperature of the film, preferably 5° C. below the melting temperature of the film, while stretching the film an additional amount of at least 1.3 times the length after the first stretching, preferably 1.3 to 2 times, in the direction of its length, the amount of stretch of from 2 to 4 times in the first stretching step being sufficiently low to permit stretching at least 1.3 times in the second stretching step, annealing the film at a temperature of about $T_2$ while allowing the film to relax, preferably at least 15% in the direction of its length and cooling the film while preventing retraction of the film in the direction of its length.

The melting temperature for polyethylene structures is not a sharply defined melting point. Polyethylene melts over a melting temperature range. The crystalline structure of polyethylene at normal room temperatures begins to disappear at an elevated temperature and is no longer evident at some higher elevated temperature. These two temperatures define the melting temperature range. For the purpose of the present specification, we refer to melting temperature as the temperature at which the crystalline structure is no longer evident; i.e., the upper temperature of the melting temperature range. The melting temperature differs for different polyethylene compositions and seems to depend on molecular weight, density, the extent of chain branching, etc.

A number of techniques are available for obtaining the melting temperature. Hunter and Oakes describe a density measurement method in Transactions of the Faraday Society 41, 49 (1945). Raine, Richards and Ryder in Transactions of the Faraday Society 41, 56 (1945) describe a method based on heat capacity measurements. Krimm and Tobolsky in Journal of Polymer Science 7, 57 (1951) describe a method based on X-ray measurements. Cobbs and Burton in Journal of Polymer Science 10, 275–290 (1953) describe an infra-red technique, which technique was used to obtain the results hereinafter.

In using the infra-red technique, it is first necessary to find an infra-red band which varies only with the amount of crystallinity of the polyethylene film. Hence, the infra-red spectrum (650–3200 cm.$^{-1}$) was investigated at room temperature and at a temperature above the melting temperature of the particular sample of polyethylene film. For polyethylene, a band at 732 cm.$^{-1}$ was found to disappear above the melting temperature. By observing the intensity of this band at various temperatures at intervals ranging from substantially room temperature up to a temperature where the polyethylene has melted, the lowest temperature at which the crystalline structure was no longer evident was determined. This latter temperature is the melting temperature.

FIGURE 1 is a diagrammatic representation of a specific embodiment of this invention.

In the specific embodiment, polyethylene film 9 is wound from film supply roll 10 onto a series of four driven rolls 11 through 14. A sample of the polyethylene film had been previously tested according to the method of Cobbs and Burton and found to have a melting temperature range extending from about 80° C. to 105° C. The rolls 11 through 14 were, therefore, heated internally to 70° C., a temperature within the range of 50° C. to the melting temperature 105° C. Heating was accomplished by passing water at 70° C. through the rolls.

Next, the film was led to rolls 15 through 18 maintained at 70° C. and all rotating at a speed greater than the rotative speed of rolls 11 through 14 to stretch the film 3.5 times in the longitudinal direction. Then the film was passed to preheating rolls 19 through 21, driven at the same speed as rolls 15 through 18 but heated to 100° C. by passing water at 100° C. through the rolls. The film was then annealed on rolls 22 through 25 over a period of 3 seconds. During annealing, the film was stretched an additional 1.3 times between rolls 21 and 22. Rolls 22 through 25 were heated to the same temperature as rolls 19 through 21, approximately 100° C., and were rotated at a higher speed than rolls 19 through 21 to provide the additional stretch.

Next, the film was passed to roll 26. Rotation of roll 26 was controlled to permit the film to contract 23% between roll 25 and roll 26. Rolls 26 through 28, all rotating at the same speed and maintained at a temperature of about 100° C., served to anneal the film while the film was permitted to relax over a period of 3 seconds.

The film was then passed to rolls 29 through 35. These rolls were rotated at the same speed as the previous rolls 26 through 28 to prevent retraction. Each successive roll was maintained at a lower temperature than the previous roll to cool the film gradually to room temperature. The film was then collected by being wound on roll 36.

In the following table, Table I, the properties of the polyethylene film of this invention, film A, are compared to those of unoriented polyethylene film, film B.

TABLE I

| Film | Birefringence (× 10³) | Tensile Modulus (p.s.i. × 10⁻³) | Elongation at Break (percent) | Tenacity (p.s.i. × 10⁻³) | Shrinkage at 75° C. (percent) |
|---|---|---|---|---|---|
| A | 27.1 | 26.6 | 101 | 4.0 | 4 |
| B | 1.0 | 16.3 | 549 | 1.6 | 3 |

The heat seal strengths of both films were comparable, both measuring about 550 grams per 1.5 inches. The film of the invention, film A, was stiff, glossy and transparent. The unoriented film, film B, on the other hand, was limp, dull and translucent. The other physical properties of the film of the invention, film A, such as strength and elongation, are comparable to those produced by ordinary orienting techniques in all respects except shrinkage. The shrinkage characteristics of the film, as evidenced by a smooth appearing heat seal and low percent shrinkage at 75° C., are far superior to oriented film and compare to the unoriented film. Oriented film produced without a final relaxation step displays 15% shrinkage and, when heat sealed, tends to pucker. Thus the film of the invention displays the desirable properties of both oriented and unoriented films.

The examples which follow are further illustrative of the practice of this invention. In the examples and in the specific embodiment previously described, tenacity and elongation were measured in the conventional manner. The tensile modulus, a measure of the stiffness or limpness of the film, was obtained as the slope of the stress-strain curve at 1% elongation when the sample is elongated at a rate of 100% per minute. Birefringence, a measure of the degree of orientation, was obtained as the difference in the refractive indexes of the film parallel to and perpendicular to the axis of orientation. Heat seal strength was measured by superimposing two ½ inch wide pieces of film, sealing them together using a sealing bar ⅛ inch wide at a temperature of 200° C. at 10 p.s.i. for one second and measuring the force in grams required to pull the seals apart in a Suter Tensile Tester. Shrinkage was measured by immersing a 50 cm. length of the film in water at 75° C. for 12 minutes and measuring the final length.

*Example I*

A polyethylene film having a melting temperature range of 80° C. to 105° C. was stretched 2 times its original length at a temperature of 70° C. in the apparatus previously described. The film was then heated to 100° C. and stretched an additional 2 times its length after the first stretching. Next, the film was annealed at 100° C. and allowed to relax 10% over a period of 3 seconds, and finally cooled to room temperature. The properties of the resulting film are compared to an unoriented film in the following table, Table II.

TABLE II

| Film | Birefringence (× 10³) | Tensile Modulus (p.s.i. × 10⁻³) | Elongation at Break (percent) | Tenacity (p.s.i. × 10⁻³) | Shrinkage at 75° C. (percent) |
|---|---|---|---|---|---|
| Example I | 28.5 | 30.0 | 95 | 4.5 | 4.2 |
| Unoriented | 1.0 | 16.0 | 549 | 1.6 | 3 |

*Example II*

A polyethylene film having a melting temperature range of 95° C. to 120° C. was stretched 3 times its original length at a temperature of 90° C. in the apparatus previously described. The temperature of the film was raised to 110° C. and stretched an additional 1.3 times its length after the first stretching. Then at 110° C. it was allowed to relax 25% over a period of 3 seconds and finally allowed to cool to room temperature. The properties of the film are compared to those of unoriented film in Table III below:

TABLE III

| Film | Birefringence (× 10³) | Tensile Modulus (p.s.i. × 10⁻³) | Elongation at Break (percent) | Tenacity (p.s.i. × 10⁻³) | Shrinkage at 75° C. (percent) |
|---|---|---|---|---|---|
| Example II | 30.0 | 90 | 78 | 7.5 | 3.5 |
| Unoriented | 2.0 | 40 | 372 | 3.0 | 3 |

*Example III*

A polyethylene film having a melting temperature range of 80° C.–105° C. was stretched 2.4 times its original length at a temperature of 64° C. This film was then heated to 100° C. and stretched an additional 1.3 times its length after the first stretching. Next, the film was permitted to relax completely while the temperature was maintained at 100° C. The process was conducted on rolls substantially as shown in FIGURE 1. The process and the properties of the resulting film are summarized below:

| Step I | | Step II | | Total Stretch | Percent Shrinkage at 75° C. |
|---|---|---|---|---|---|
| Stretch Ratio | Temperature, °C. | Stretch Ratio | Temperature, °C. | | |
| 2.4× | 64 | 1.3 | 100 | 3.15 | 0.25 |

As a control, the polyethylene film having a melting temperature range of 80° C.–105° C. was stretched 2.8 times its original length (the maximum extent possible without tearing the film) at a temperature of 64° C. This film was then heated to 100° C. and stretched an additional 1.03 times its length after the first stretching (the maximum extent possible without tearing the film). Next, the film was permitted to relax completely while the temperature was maintained at 100° C. The process was conducted on rolls substantially as shown in FIGURE 1. The process and the properties of the resulting film are summarized below:

| Step I | | Step II | | Total Stretch | Percent Shrinkage at 75° C. |
|---|---|---|---|---|---|
| Stretch Ratio | Temperature, °C. | Stretch Ratio | Temperature, °C. | | |
| 2.8× | 64 | 1.03× | 100 | 2.88 | 1.3 |

It will be noted that when stretching is not performed to the maximum extent possible in the first step but is divided between the two steps in accordance with the prescribed process, the total stretch obtained is substantially greater and the polyethylene film produced displays substantially less shrinkage.

The important elements of the method of this invention may be integrated in a continuous process or they may be performed separately in a batch process. In the continuous process illustrated, the temperature of the film was controlled by the temperature of the rolls. The rolls were heated by passing a suitable hot fluid through the rolls; water in Example I and a water-alcohol mixture in Example II. Steam, heated oil or electrical methods may also be used to heat the rolls. It is also possible to expose the film directly to hot liquids or gases to obtain the desired temperatures. Exposure may be accomplished by passing the film through tanks or other suitable enclosures for the heated fluids.

No matter what particular apparatus is used, continuous or batch, rolls or baths, it is imperative to adhere to the critical steps specified in order to obtain a polyethylene film displaying orientation and dimensional stability at elevated temperatures. The critical steps are:

(1) Initially stretching the film 2 to 4 times at a temperature between 50° C. and the melting temperature. The amount of stretching between 2 and 4 times should be low enough to permit sufficient additional stretch (at least 1.3 times) in the second stretching step; a stretch of below 2 times in the initial stretch will not provide adequate orientation of the structure for desirable gloss, transparency and stiffness.

(2) A second stretching step of at least 1.3 times the length after the first stretching step at a temperature between that of the first stretching step and the melting temperature. The temperature here should be high, preferably about 5° C. below the melting temperature. A lower temperature does not provide the optimum improvement in dimensional stability. The film tends to break at higher temperatures.

(3) A relaxing step at a temperature substantially that of the second stretching step. At least 15% relaxation is preferred to provide optimum dimensional stability in the film. Without this step, the oriented film displays shrinkage at 75° C. of 15% or greater.

(4) Cooling the film while preventing further retraction of the film. Preventing retraction conserves the properties gained by the previous three steps.

Steps 2 and 3, the so called annealing or conditioning steps, may each be performed in 3 seconds on the apparatus illustrated. However, periods of more than 3 seconds may be used without adversely affecting the properties of the film. In some equipment it may be necessary to use periods greater than 3 seconds. In other equipment where heat transfer to the film is substantially high, periods shorter than 3 seconds may be used. The precise time required for the conditioning steps may easily be determined by one skilled in the art.

The invention provides a film possessing all the desirable characteristics of an oriented film yet having greatly improved shrinkage properties, less than 5% at 45° C. to 75° C. The film shows, by diffraction analysis, an oriented molecular structure, yet its improved shrinkage properties indicate a film with no appreciable intermolecular strain.

A theoretical explanation of the changes that occur during the process of this invention will, perhaps, provide a clearer picture of the final structure. This theory should not be considered as limitative of the invention. Polyethylene is a highly branched polymer having long and short branches, the branches being generally longer and fewer in the case of high density polymers. In the undrawn state, there exist crystalline regions of primarily straight-chain portions of the molecules and amorphous regions of the unoriented, intertwined, branched-chain portions of the molecules. Upon drawing, the crystalline regions become oriented in the direction of mechanical tension. The amorphous regions are also oriented but because of branched chains and intertwining of molecules, points of entanglement and contact remain after drawing. At these points, internal strains are set up; molecules are forced into unnatural positions. Upon applying heat, the strain is released and the molecules spring back into a more natural position; the result, high shrinkage. However, by applying heat while drawing the film an additional amount, the largest portion of the strain is released by slippage of molecules externally held in the oriented position. Subsequent relaxation while continuing to heat the film relieves remaining strain. The combination of steps of releasing strain while keeping the film under tension followed by relaxing the film leaves the molecules in a still substantially oriented but strain-relieved condition.

The film forms excellent packages in standard heat sealing equipment. No substantial puckering is evident adjacent to the heat seals. The packages formed may be exposed to temperatures as high as 75° C. during storage or use with no noticeable effect. The packages are useful for packaging meats, poultry, produce, textiles, chemicals, hardware, etc.

The process for making the film does not require any substantial alteration of existing processes for preparing polyethylene films. The process is practical, economical and not complicated. Although described for preparing polyethylene films, the process may be used for similar olefinic polymers such as polypropylene, polyisobutylene and the like.

This application is a continuation-in-part of my copending application Serial No. 497,034, filed March 28, 1955, now abandoned.

As many widely different embodiments may be made without departing from the scope of the invention, it is understood that the invention is not limited except as defined in the appended claims.

Having described my invention, I claim:

1. A process for orienting polyethylene film which comprises stretching the film an amount from 2 to 4 times its original length in the direction of its length while maintaining the temperature of the film at $T_1$, $T_1$ being within the range from 50° C. to 5° C. below the melting temperature of the film, annealing the film at a temperature of $T_2$, $T_2$ being within the range from $T_1$ to the melting temperature of the film, while stretching the film in the direction of its length an amount of at least 1.3 times the length after the first stretching, the amount of stretch of from 2 to 4 times in the first stretching step being below the maximum amount of stretch possible and sufficiently low to permit stretching at least 1.3 times in the second stretching step, annealing the film at a temperature of about $T_2$ while allowing the film to relax in the direction of its length and cooling the film while preventing retraction of the film in the direction of its length.

2. A process for orienting polyethylene film which comprises stretching the film an amount from 2 to 4 times its original length in the direction of its length while maintaining the temperature of the film within the range from 50° C. to 5° C. below the melting temperature of the film, annealing the film at a temperature of 5° C. below the melting temperature of the film while stretching the film in the direction of its length 1.3 to 2 times its length after the first stretching, the amount of stretch of from 2 to 4 times in the first stretching step being below the maximum amount of stretch possible and sufficiently low to permit stretching at least 1.3 times in the second stretching step, annealing the film at a temperature of 5° C. below the melting temperature of the film while allowing the film to relax at least 15% in the direction of its length and cooling the film while preventing retraction of the film in the direction of its length.

3. A process for orienting polyethylene film having a melting temperature range from 80° C. to 105° C. which comprises stretching the film an amount from 2 to 4 times its original length in the direction of its length while maintaining the temperature of the film at $T_1$, $T_1$ being within the range from 50° C. to 105° C., annealing the film at a temperature from $T_1$ to 105° C. while stretching the film in the direction of its length an amount of at least 1.3 times its length after the first stretching, the amount of stretch of from 2 to 4 times in the first stretching step being below the maximum amount of stretch possible and sufficiently low to permit stretching at least 1.3 times in the second stretching step, annealing the film at a temperature from $T_1$ to 105° C. while allowing the film to relax at least 15% in the direction of its length and cooling the film while preventing retraction of the film in the direction of its length.

4. A process for orienting polyethylene film having a melting temperature range from 80° C. to 105° C. which comprises stretching the film an amount from 2 to 4 times its original length in the direction of its length while maintaining the temperature of the film at $T_1$, $T_1$ being within the range from 50° C. to 100° C., annealing the film at a temperature of 100° C. while stretching the film in the direction of its length 1.3 to 2 times its length after the first stretching, the amount of stretch of from 2 to 4 times in the first stretching step being below the maximum amount of stretch possible and sufficiently low to permit stretching at least 1.3 times in the second stretching step, annealing the film at a temperature of 100° C. while allowing the film to relax at least 15% in the direction of its length and cooling the film while preventing retraction of the film in the direction of its length.

5. A process for orienting polyethylene film which comprises passing unoriented polyethylene film in one direction successively through 6 sets of rolls, the first set of rolls at a tempertaure of $T_1$, $T_1$ being a temperature within the range from 50° C. to 5° C. below the melting temperature of the polyethylene film, the second set at a temperature of $T_1$ rotating at a faster speed than the first set to stretch the film an amount from 2 to 4 times its original length, the third set at a temperature $T_2$, $T_2$ being within the range from $T_1$ to the melting temperature of the polyethylene film rotating at the same speed as the second set, the fourth set at a temperature of $T_2$ and rotating at a faster speed than the third set to stretch the film an amount at least 1.3 times the length of the film as the film entered the fourth set of rolls, the amount of stretch of from 2 to 4 times in the stretching step between the first and second sets of rolls being below the maximum amount of stretch possible and sufficiently low to permit stretching at least 1.3 times in the stretching step between the second and third sets of rolls, a fifth set at a temperature of $T_2$ but rotating at a slower speed than the fourth set to permit relaxation of the film and a sixth set rotating at the same speed as the fifth set with each successive roll in the sixth set at a lower temperature than the roll immediately prior thereto to bring the film to room temperature.

6. A process for orienting polyethylene film which comprises passing unoriented polyethylene film having a melting temperature range from 80° C. to 105° C. in one direction successively through 6 sets of rolls, the first set of rolls at a temperature of $T_1$, $T_1$ being a temperature within the range from 50° C. to 100° C., the second set at a temperature of $T_1$ rotating at a faster speed than the first set to stretch the film an amount from 2 to 4 times its original length, the third set at a temperature of 100° C. rotating at the same speed as the second set, the fourth set at a temperature of 100° C. and rotating at a faster speed than the third set to stretch the film 1.3 to 2 times the length of the film as the film entered the fourth set of rolls, the amount of stretch of from 2 to 4 times in the stretching step between the first and second sets of rolls being below the maximum amount of stretch possible and sufficiently low to permit stretching at least 1.3 times in the stretching step between the second and third sets of rolls, a fifth set at a temperature of 100° C. but rotating at a slower speed than the fourth set to permit relaxation of the film of at least 15% and a sixth set rotating at the same speed as the fifth set with each successive roll in the sixth set at a lower temperature than the roll immediately prior thereto to bring the film to room temperature.

References Cited in the file of this patent

UNITED STATES PATENTS

| | | |
|---|---|---|
| 2,325,060 | Ingersoll | July 27, 1943 |
| 2,517,570 | Irons | Aug. 8, 1950 |
| 2,517,581 | Lowry et al. | Aug. 8, 1950 |